United States Patent [19]

Surka

[11] Patent Number: 5,438,188
[45] Date of Patent: Aug. 1, 1995

[54] METHOD AND APPARATUS FOR DECODING BAR CODE IMAGES USING INFORMATION FROM PREVIOUS SCAN LINES

[75] Inventor: Stefan Surka, Sandy Hook, Conn.

[73] Assignee: United Parcel Service of America, Inc., Atlanta, Ga.

[21] Appl. No.: 221,877

[22] Filed: Apr. 1, 1994

[51] Int. Cl.$^6$ ............................................. G06K 7/10
[52] U.S. Cl. .................................... 235/462; 235/463
[58] Field of Search ................................ 235/462, 463

[56] References Cited

U.S. PATENT DOCUMENTS

| | | |
|---|---|---|
| 3,410,991 | 11/1968 | van Berkel . |
| 3,833,882 | 9/1974 | Busby . |
| 4,473,746 | 9/1984 | Edmonds . |
| 4,648,120 | 3/1987 | Chittineni . |
| 4,749,879 | 6/1988 | Peterson et al. . |
| 4,797,943 | 1/1989 | Murayama et al. . |
| 4,873,426 | 10/1989 | Sarna et al. . |
| 4,958,064 | 9/1990 | Kirkpatrick . |
| 4,973,829 | 11/1990 | Ishida et al. . |
| 4,988,852 | 1/1991 | Krishnan . |
| 4,992,650 | 2/1991 | Somerville . |
| 5,036,182 | 7/1991 | Ouchi et al. . |
| 5,045,677 | 9/1991 | Okamura . |
| 5,073,954 | 12/1991 | Van Tyne et al. . |
| 5,073,958 | 12/1991 | Imme . |
| 5,081,689 | 1/1992 | Meyer et al. . |
| 5,120,940 | 6/1992 | Willsie . |
| 5,142,592 | 8/1992 | Moler . |
| 5,155,343 | 10/1992 | Chandler et al. . |
| 5,155,344 | 10/1992 | Fardeau et al. . |
| 5,296,691 | 3/1994 | Waldron .......................... 235/462 |

FOREIGN PATENT DOCUMENTS

| | | |
|---|---|---|
| 0449634 | 10/1991 | European Pat. Off. . |
| 0449645 | 10/1991 | European Pat. Off. . |
| 0450878 | 10/1991 | European Pat. Off. . |
| 0026623 | 3/1978 | Japan . |
| 0052779 | 3/1986 | Japan . |
| 0162181 | 7/1987 | Japan . |
| 0123179 | 5/1988 | Japan . |

OTHER PUBLICATIONS

"Image Enhancement Processing", E. M. Winter, IBM Technical Disclosure Bulletin, vol. 19, No. 5, 10-86.
"Two Sensor Bar Code Scanner Using Sensor Spacer As A Reference" R. J. Kulikowski and R. G. Pierlott, III, IBM Technical Bulletin, vol. 17, 12-74. No date.
"Peak Classifer for Bar Code Waveforms", E. Joseph & T. Pavlidis, 11th International Conference on Pattern Recognition, The Hague, The Netherlands, Aug. 30–Sep. 3, 1992.

Primary Examiner—Harold Pitts
Attorney, Agent, or Firm—Schnader, Harrison, Segal & Lewis

[57] ABSTRACT

A method and apparatus for decoding a pixel image representative of a bar code symbol. A bar code symbol is scanned along a first scan line to determine a first set of candidate character values, each candidate character value of this first set having an error value associated therewith. If the scanning along the first scan line results in an unsuccessful reading of the bar code symbol, then the bar code symbol is scanned along a second differing scan line to determine a second set of candidate character values, each candidate character value of this second set having an error value associated therewith. Corresponding error values associated with the first and second sets of candidate character values are next compared. For each corresponding pair of candidate character values from the first and second sets, the candidate character value having the smallest associated error value is selected. A third set of candidate character values is formed in accordance with the selected candidate character values, and the bar code symbol is decoded in accordance with the third set of candidate character values.

10 Claims, 9 Drawing Sheets

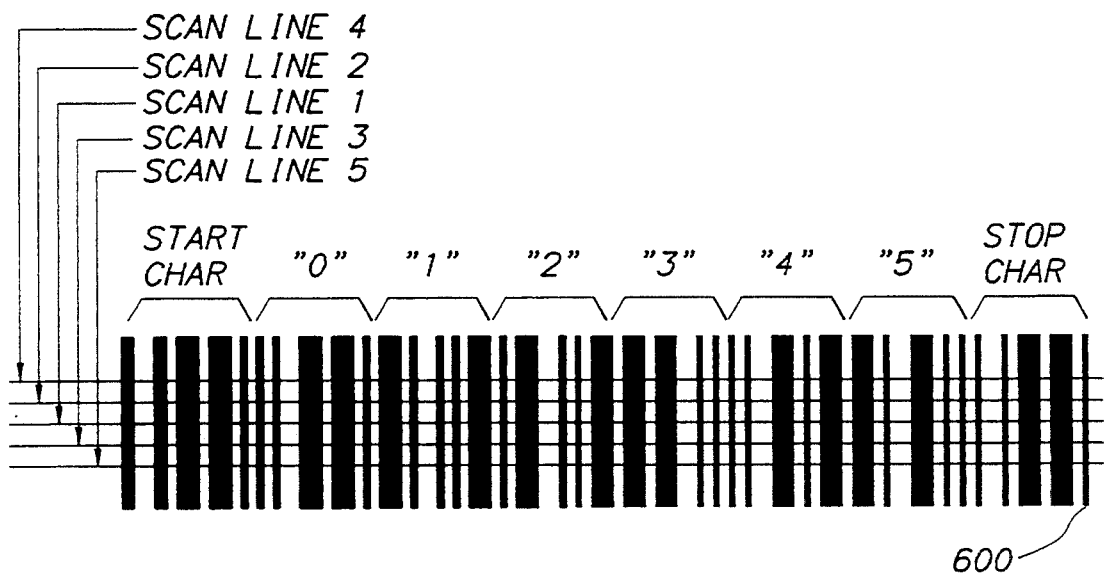

| SCAN LINE NUMBER | DECODE VALUE/ ERROR VALUE | DECODE VALUE/ ERROR VALUE | DECODE VALUE/ ERROR VALUE | DECODE VALUE/ ERROR VALUE | DECODE VALUE/ ERROR VALUE | DECODE VALUE/ ERROR VALUE |
|---|---|---|---|---|---|---|
| 1 | DEC="A" ERR=0.91 | DEC="1" ERR=0.52 | DEC=-1 ERR=-1 | DEC="M" ERR=0.95 | DEC="4" ERR=0.01 | DEC="5" ERR=0.10 |
| 2 | DEC="A" ERR=0.91 | DEC="1" ERR=0.40 | DEC="2" ERR=0.59 | DEC="M" ERR=0.95 | DEC="4" ERR=0.01 | DEC="5" ERR=0.10 |
| 3 | DEC="0" ERR=0.20 | DEC="1" ERR=0.40 | DEC="2" ERR=0.59 | DEC="M" ERR=0.95 | DEC="4" ERR=0.01 | DEC="5" ERR=0.10 |
| 4 | DEC="0" ERR=0.20 | DEC="1" ERR=0.40 | DEC="2" ERR=0.09 | DEC="M" ERR=0.95 | DEC="4" ERR=0.01 | DEC="5" ERR=0.10 |
| 5 | DEC="0" ERR=0.20 | DEC="1" ERR=0.40 | DEC="2" ERR=0.09 | DEC="3" ERR=0.15 | DEC="4" ERR=0.01 | DEC="5" ERR=0.10 |

*FIG. 6*

METHOD AND APPARATUS FOR DECODING BAR CODE IMAGES USING INFORMATION FROM PREVIOUS SCAN LINES

FIELD OF INVENTION

The present invention relates to the detection and decoding of bar code symbols and, in particular, to the decoding of bar code symbols represented by low resolution or degraded CCD images.

BACKGROUND

Typical bar code decoding algorithms use hard thresholding to determine whether a given group of bars and spaces represents a particular character. These algorithms operate by first sensing the widths of bars and spaces in an input image and then normalizing these sensed widths in accordance with a nominal width "X" which is equivalent to the narrowest bar or space in the symbology being decoded. Next, each normalized width is thresholded and classified as being one of a plurality prototype widths. For example, in code 39 where each bar or space can either be narrow (1X) or wide (2-3X), each normalized width is thresholded against a value equivalent to 1.75X. If the normalized width is greater than 1.75X, then the element is determined to be wide, otherwise the element is determined to be narrow. A set of these thresholded widths representing a character in the symbol being decoded is then matched against a reference table which defines the character assignments for the symbology being decoded. This decoding algorithm for Code 39 is set forth in Appendix B of the Uniform Symbology Specification for Code 39, dated 1986, published by the Automatic Identification Manufacturers, Inc., Pittsburgh, Pa.

Code 128 is also typically decoded using hard thresholding. In Code 128, the normalized width of each bar or space is either 1X, 2X, 3X, or 4X and each Code 128 character is comprised of three bars and three spaces. In Code 128, the normalized widths of the sensed bars and spaces are used to calculate the values T1, T2, T3, T4 which respectively correspond to the (i) distance from the leading edge of the first bar to the leading edge of the second bar, (ii) the distance from the trailing edge of the first bar to the trailing edge of the second bar, (iii) the distance from the leading edge of the second bar to the leading edge of the third bar, and (iv) the distance from the trailing edge of the second bar to the trailing edge of the third bar. Each calculated value T1, T2, T3, T4 is next normalized to the dimension X and then classified as falling within one of six potential width ranges. Finally, each value T1, T2, T3, T4 is determined to have a value equivalent to the midpoint of the range in which it has been classified. A set of these thresholded values T1, T2, T3, T4 representing a character in the symbol being decoded is then matched against a reference table which defines the character assignments for the symbology. This decoding algorithm for Code 128 is set forth in Appendix B of the Uniform Symbology Specification for Code 128, dated 1986, published by the Automatic Identification Manufacturers, Inc., Pittsburgh, Pa.

Hard thresholding techniques often produce errors when the normalized width value being thresholded falls near the edge of a thresholding range. This is particularly the case when low resolution images are used as the basis for calculating the normalized widths, because in such images the width of a bar or space in the bar code symbol being imaged may be equivalent in dimension to a single pixel in the image used to sense the symbol.

During the decoding of bar code symbols represented by low resolution images, it often happens that the bar code symbol cannot be successfully decoded by an initial scan through the symbol. Decoding systems recognize this condition when there has been a checksum error, or when a set of thresholded values representing one of the characters in the bar code symbol cannot be successfully matched against any of the entries in the decode reference table. In such situations, all the information representing the current scan of the bar code symbol is often thrown away, and the bar code symbol is evaluated by scanning it again (possibly through a different scan line) and attempting to evaluate the width measurements sensed from this further scan.

It is an object of the present invention to provide an improved system for decoding bar code symbols represented by low resolution images.

It is a further object of the present invention to provide a system for decoding bar code symbols that is more accurate and robust than hard thresholding methods.

It is a further object of the present invention to provide a system for combining information from multiple scan lines to enhance the decoding process in those cases where a bar code symbol cannot be successfully decoded by previous scan lines.

Further objects and advantages of the invention will become apparent from the description which follows.

SUMMARY OF THE INVENTION

A method and apparatus for decoding a pixel image representative of a bar code symbol. A bar code symbol is scanned along a first scan line to determine a first set of candidate character values, each candidate character value of this first set having an error value associated therewith. If the scanning along the first scan line results in an unsuccessful reading of the bar code symbol, then the bar code symbol is scanned along a second differing scan line to determine a second set of candidate character values, each candidate character value of this second set having an error value associated therewith. Corresponding error values associated with the first and second sets of candidate character values are next compared. For each corresponding pair of candidate character values from the first and second sets, the candidate character value having the smallest associated error value is selected. A third set of candidate character values is formed in accordance with the selected candidate character values, and the bar code symbol is decoded in accordance with the third set of candidate character values.

BRIEF DESCRIPTION OF THE DRAWINGS

FIG. 6 illustrates the operation of the system of FIG. 5 on an exemplary bar code symbol.

DETAILED OF THE PREFERRED EMBODIMENTS

The present invention is directed to a symbology identification and decoding system which includes (i) a method and apparatus for decoding individual characters encoded using bar code symbols, (ii) a method and apparatus for identifying a bar code symbology that is represented within a pixel image, and (iii) a method and apparatus for decoding bar code symbols using information from previous scan lines. The operation of each of these aspects of the present invention is described in detail below.

Bar Code Character Decoding System

Figure 1:
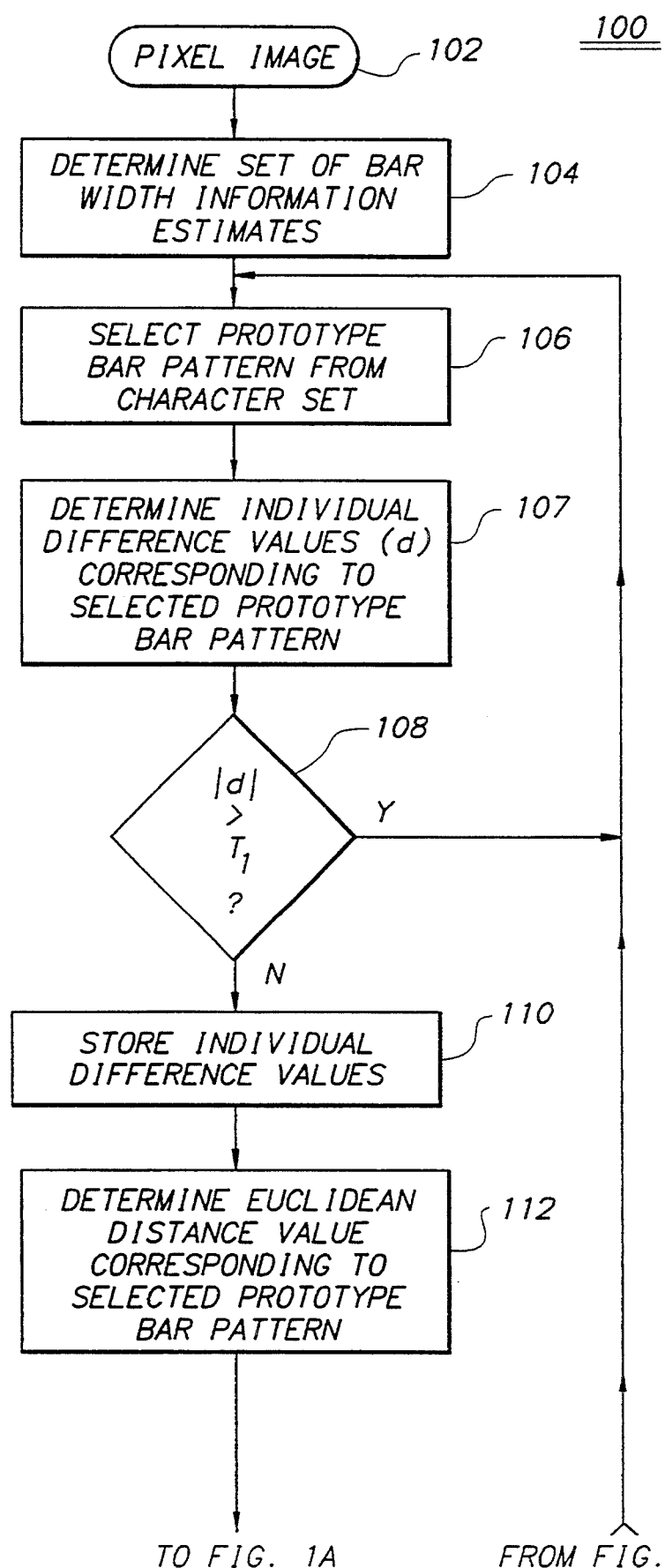
FIGS. 1, 1A show a flow diagram illustrating the operation of a system for decoding an individual character in a bar code symbol in accordance with a preferred embodiment of the present invention.
Figure 1A:
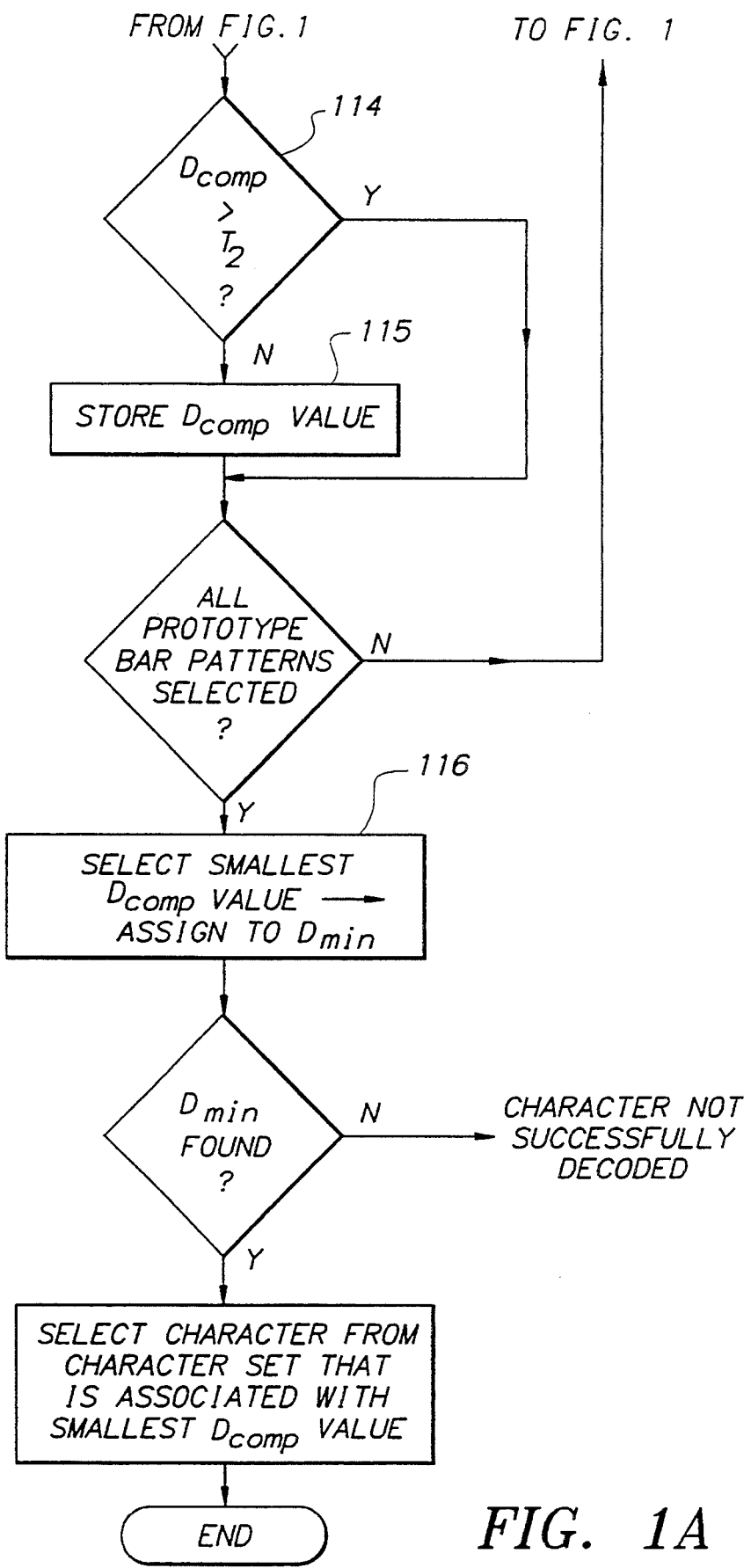

Referring now to FIGS. 1, 1A there is shown a flow diagram illustrating the operation of a system 100 for decoding an individual character in a bar code symbol in accordance with a preferred embodiment of the present invention. System 100 accepts as its input pixel image 102. Pixel image 102 may be a low resolution image representative of a bar code symbol that has been sensed by a CCD camera. Estimator 104 is provided for determining a plurality of bar width information estimates representative of an encoded character from pixel image 102. In the preferred embodiment, the bar width information estimates determined by estimator 104 are grouped to form a multi-order feature vector.

Referring still to FIGS. 1, 1A, selector 106 is provided for selecting a prototype bar pattern from the character set associated with the bar code symbology being decoded. Thus, for example, if Code 39 were the symbology being decoded, selector 106 might begin by selecting the prototype bar pattern which corresponds to the letter "A". This prototype pattern consists of the following: WB, NS, NB, NS, NB, WS, NB, NS, WB, where "WB" represents a wide bar, "NB" represents a narrow bar, "WS" represents a wide space, and "NS" represents a narrow space. Selector 106 further provides a set of predetermined feature values corresponding to the selected prototype bar pattern. In the preferred embodiment, this set of predetermined feature values is used to provide a predetermined multi-order feature vector to subtractor 107. The multi-order feature vectors provided by estimator 104 and selector 106 will be described more fully below in conjunction with FIGS. 2, 3 and 4.

Figure 2:
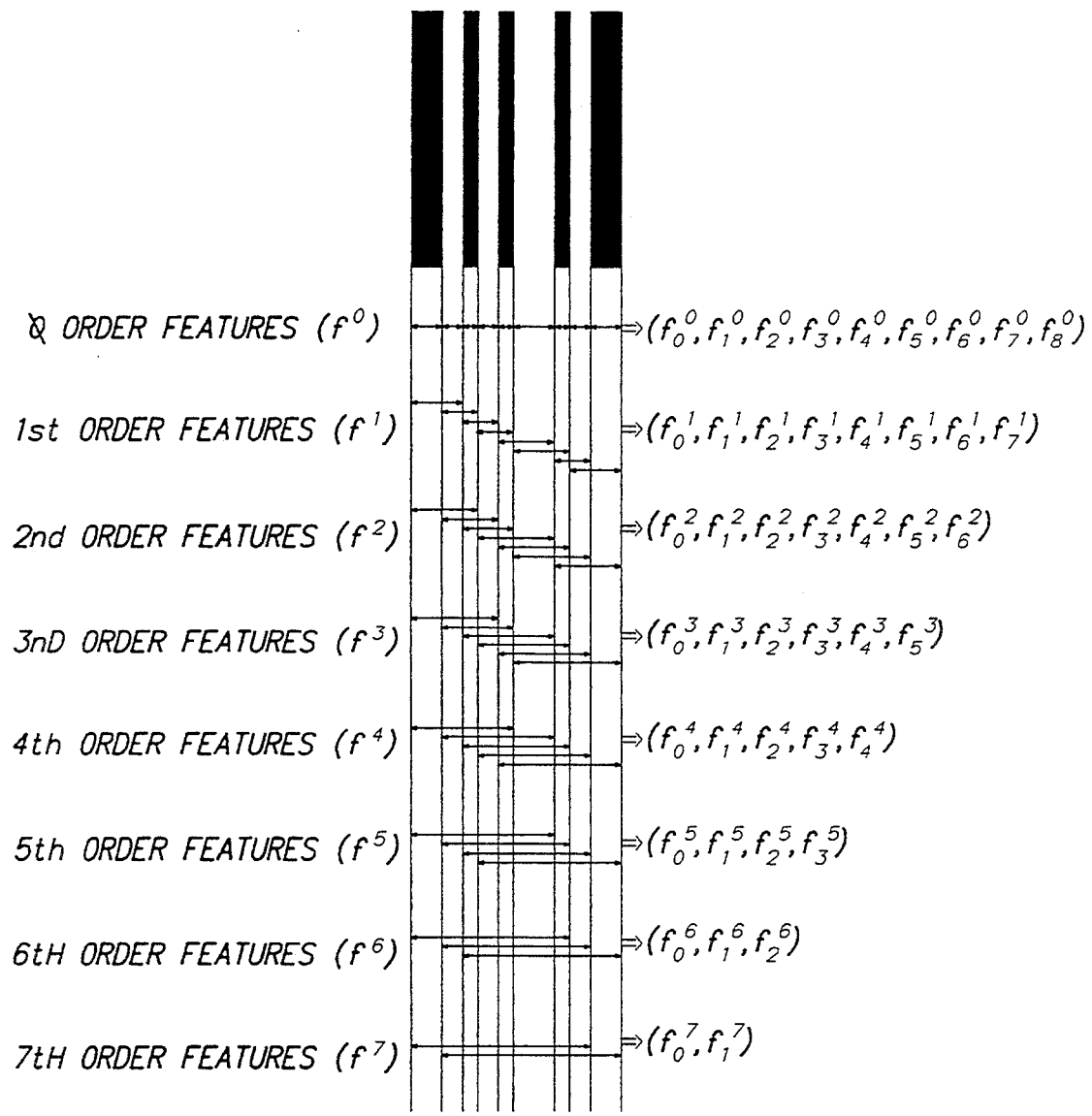
FIG. 2 shows an exemplary set of feature vectors for use in connection with the Code 39 symbology in accordance a preferred embodiment of the present invention.

Subtractor 107 is provided for comparing on a one-to-one basis corresponding elements from the feature vectors provided by estimator 104 and selector 106. In the preferred embodiment, the feature vectors provided by estimator 104 and selector 106 will include features from more than one order, although single order feature vectors may be used. The structure of a preferred feature vector for use in connection with the decoding of bar code symbols that have been encoded in accordance with the Code 39 symbology is shown in FIG. 2. A preferred feature vector for Code 39 includes the features from the zero, first, second, third, fourth, fifth, sixth and seventh orders. As shown in FIG. 2, this includes nine zero order features ($f_0^0$, $f_1^0$, $f_2^0$, $f_4^0$, $f_3^0$, $f_5^0$, $f_6^0$, $f_7^0$, $f_8$) each of which represents the width of a bar or space in the bar code symbol In the feature vector provided by estimator 104, all the feature values are based upon estimates of these widths as determined from pixel image 102. In the feature vector provided by selector 106, all the features will represent predetermined ideal widths corresponding to a selected prototype bar pattern.

Referring still to FIG. 2, the preferred feature vector used for decoding Code 39 also includes eight first order features ($f_0^1$, $f_1^1$, $f_2^1$, $f_3^1$, $f_4^1$, $f_5^1$, $f_6^1$, $f_7^1$). In this first order, $f_0^1$, $f_2^1$, $f_4^1$, $f_6^1$, represent the distance between the leading between the leading edges of adjacent bars and $f_1^1$, $f_2^1$, $f_5^1$, $f_7^1$ represent the distance between the trailing edges of adjacent bars in the bar code symbol. The preferred feature vector further includes seven second order features ($f_0^2$, $f_1^2$, $f_2^2$, $f_3^2$, $f_4^2$, $f_5^2 f_6^2$). In this second order, $f_0^2$, $f_2^2$, $f_4^2$, $f_6^2$ represent the distance between the leading edge of a first bar and the trailing edge of the adjacent bar following the first bar, and $f_1^2$, $f_3^2$, $f_5^2$ represent the distance between the trailing edge of a first bar and the leading edge of the second bar following that first bar. The preferred feature vector for Code 39 further includes sixth third order features ($f_0^3$, $f_1^3$, $f_2^3$, $f_3^3$, $f_4^3 f_5^3$). In this third order, $f_0^3, f_2^3$, $f_5^3$). represent the distance between the leading edge of a first bar and the leading edge of the second bar following that first bar, and $f_1^3$, $f_3^3$, $f_5^3$ represent the distance between the trailing edge of a first bar and the trailing edge of the second bar following that first bar. Five fourth order features ($f_0^4$, $f_1^4$, $f_2^4$, $f_3^4 f_4^4$) are also included. In this Fourth order, $f_0^4$, $f_3^4$, $f_4^4$ represent the distance between the leading edge of a first bar and the trailing edge of the second bar following that first bar, and $f_1^4$, $f_3^4$ represent the distance between the trailing edge of a first bar and the leading edge of the second bar following that first bar. Four fifth order features ($f_0^5$, $f_1^5$, $f_2^5$, $f_3^5$) are also provided. In the fifth order, $f_0^5$, $f_2^5$ represent the distance between the leading edge of a first bar and the leading edge of the third bar following that first bar and $f_1^5$, $f_3^5$ represent the distance between the trailing edge of a first bar and the trailing edge of the third bar following the first bar. Three sixth order features ($f_0^6$, $f_1^6$, $f_2^6$) are further provided. In the sixth order, $f_0^6$, $f_2^6$ represent the distance between the leading edge of a first bar and the trailing edge of the third bar following that first bar and $f_1^6$ represents the distance between the trailing edge of a first bar and the leading edge of the fourth bar following that first bar. Finally, two seventh order features ($f_0^7$, $f_1^7$) are provided In the seventh order, $f_0^7$ represents the distance between the leading edge of a first bar and the leading edge of the fourth bar following that first bar, and $f_1^7$ represents the distance between the trailing edge of a first bar and the trailing edge of the fourth bar following that first bar. In accordance with the preferred embodiment as applied to Code 39, the features from all the orders are concatenated to form a multi-order feature vector as shown in FIG. 4.

Figure 3:
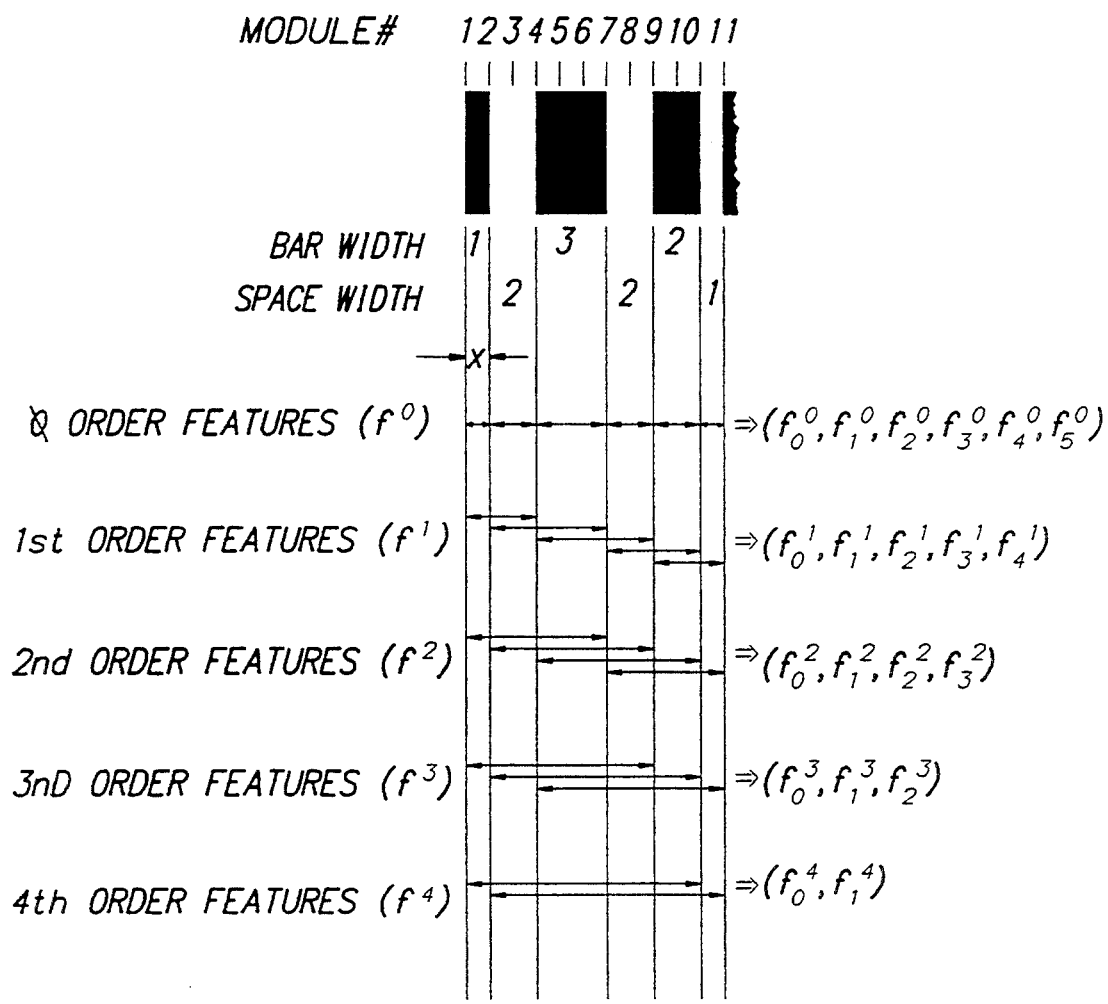
FIG. 3 shows an exemplary set of feature vectors for use in connection with the Code 128 symbology in accordance with a preferred embodiment of the present invention.

Referring now to FIG. 3, the structure of a preferred feature vector for use in connection with the decoding of bar code symbols that have been encoded in accordance with the Code 128 symbology is shown. The preferred feature vector for Code 128 includes the features from the zero, first, second, third and fourth orders. As shown in FIG. 3, this includes six "zero order"

features ($f_0^0$, $f_1^0, f_2^0 f_3^0 f_4^0 f_5^0$) each of which represents the width of a bar or space in the bar code symbol. The preferred feature vector used for decoding Code 128 also includes five "first order" features ($f_0^1, f_1^1, f_2^1 f_3^1 f_4^1$). In this first order, $f_0^1$, $f_2^1$, $f_4^1$ represent the distance between the leading edges of adjacent bars and $f_1^1$, $f_3^1$ represent the distance between the trailing edges of adjacent bars in the bar code symbol. The preferred feature vector further includes four "second order" features ($f_0^2, f_1^2, f_2^2, f_3^2$). In the second order, $f_0^2$ and $f_2^2$ represent the distance between the leading edge of a first bar and the trailing edge of the adjacent bar following the first bar and $f_1^2$ and $f_3^2$ represent the distance between the trailing edge of a first bar and the leading edge of the second bar following that first bar. The preferred feature vector, further includes three "third order" features ($f_0^3, f_1^3, f_2^3$) In this third order, $f_0^3$ and $f_2^3$ represent the distance between the leading edge of a first bar and the leading edge of the second bar following that first bar and $f_1^3$ represents the distance between the trailing edge of a first bar and the trailing edge of the second bar following that first bar. Finally, the preferred feature vector for Code 128 includes two "fourth order" features ($f_0^4, f_1^4$) In this fourth order, $f_0^4$ represents the distance between the leading edge of a first bar and the trailing edge of the second bar following that first bar, and $f_1^4$ represents the distance between the trailing edge of a first bar and the leading edge of the second bar following that first bar. In accordance with the preferred embodiment, the features from all the orders are concatenated to for a multi-order feature vector as shown in FIG. 4.

Figure 4:
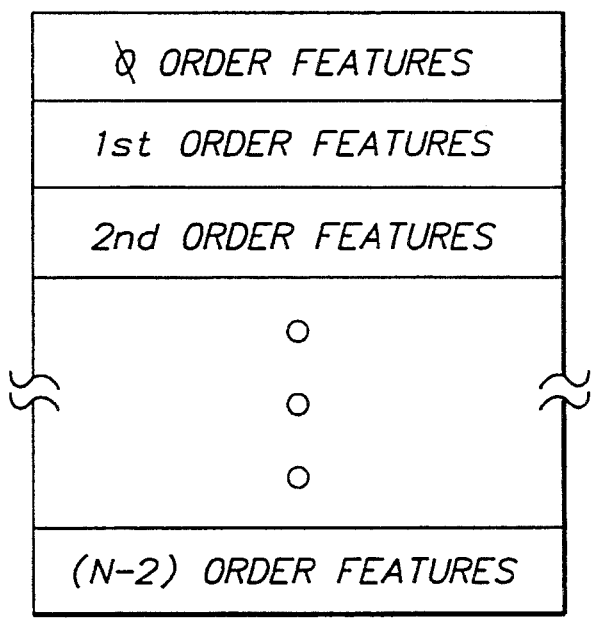
FIG. 4 shows the structure of a multi-order feature vector for use in connection with the preferred embodiment of the present invention.

Referring now to FIG. 4, there is shown the structure of a preferred multi-order feature vector in accordance with the present invention. A preferred feature vector includes all zero order features corresponding to the symbology being decoded, as well as all higher order features up to and including the (N−2)th order, where N represents the total number of all bars and spaces used to store a character in the symbology being decoded. As described above in connection with Code 39 and Code 128, the zero order features making up this multi-order feature vector represent the widths of the individual elements (bars/spaces) in the bar symbol, the first order features represent the widths of each adjacent pair of elements, the second order features represent the widths of each adjacent group of three elements, and so on.

In a further preferred embodiment, the preferred feature vector includes all zero order features corresponding to the symbology being decoded as well as all higher order features up to and including the (N/2)th order. In this alternate preferred embodiment, if (N/2) does not equal an integer, then the value of (N/2) is rounded to the next highest integer value. Thus, for Code 39 which uses a total of 9 bars and spaces to encode each character, the feature vector will include orders zero through five, and for Code 128 which uses a total of 6 bars and spaces to encode each character, the feature vector will include orders zero through three.

Referring again to FIG. 1, subtractor 107 is provided for determining on a one-to-one basis the differences between corresponding elements from the feature vectors provided by estimator 104 and selector 106. Thus, the difference between each of the zero order features in the feature vector provided by estimator 104 and each of the zero order features in the feature vector provided by selector 106 is determined; the difference between each of the first order features in the feature vector provided by estimator 104 and each of the first order features in the feature vector provided by selector 106 is determined; the difference between each of the second order features in the feature vector provided by estimator 104 and each of the second order features in the feature vector provided by selector 106 is determined; and so on. More particularly, subtractor 107 determines each individual difference value (d) for the pair of feature vectors in accordance with equation (1) below:

$$d_i^k = |e_i^k - p_i^k| = 0, \ldots, (N-2); i = 0, \ldots, (N-k) \qquad (1)$$

where e represents an estimated feature vector value provided by estimator 104, p represents a prototype feature vector value provided selector 106, k represents each order associated with both respective feature vectors, and i represents the index of the feature in the kth order.

If the difference (d) in absolute value between any of the corresponding features processed by subtractor 107 is greater than a threshold ($T_1$), then the current prototype bar pattern is rejected by comparator 108, a new prototype bar pattern is selected from the character set, and the process is repeated by subtractor 107 and comparator 108 using the multi-order feature vector associated with the newly selected prototype bar pattern. If the difference between each of the corresponding features compared by comparator 108 does not exceed the threshold T, then storage means 110 stores the plurality of individual difference values generated by calculator 107.

Next, summer 112 determines the Euclidian distance between the two feature vectors provided by estimator 104 and selector 106 by determining a composite distance value ($D_{comp}$) in accordance with equation (2) below:

$$D_{comp} = sqrt\left(\sum_k \sum_i (d_i^k)^2\right), \qquad (2)$$

$$k = 0, \ldots, (N-2); i = 0, \ldots, (N-k)$$

This composite distance $D_{comp}$ represents the Euclidian distance between the feature vector provided by estimator 104 and the feature vector associated with the prototype bar pattern selected by selector 106. Thus, for each prototype bar pattern chosen by selector 106, a composite distance $D_{comp}$ corresponding to that prototype bar pattern will be generated by summer 112 so long as the prototype bar pattern had not been rejected by comparator 108. Summer 112 preferably normalizes each $D_{comp}$ value by dividing each $D_{comp}$ value by the number of orders in the multi-order feature vectors provided to subtractor 107. Comparator 114 compares this normalized $D_{comp}$ value to a second threshold ($T_2$). If $T_2$ has been exceeded, then the current prototype bar pattern is rejected; otherwise the $D_{comp}$ value determined for the current prototype bar pattern is stored in storing means 115. In an alternate embodiment, the composite distance value $D_{comp}$ may be calculated by summing the absolute values of each individual difference value d, as opposed to using a Euclidian distance calculation. In this alternate embodiment, each $D_{comp}$ value is preferably normalized by dividing each $D_{comp}$ value by the number of orders in the multi-order feature vectors provided to subtractor 107.

After all the prototype bar patterns have been selected and processed as set forth above, selector 116 evaluates all the composite distance values stored in storing means 115 and selects the minimum composite distance value ($D_{min}$). If no composite distance values were stored in storing means 115, then the system determines that the sensed character could not be successfully decoded; otherwise the sensed character is determined to be character from the reference table associated with the prototype bar pattern corresponding to $D_{min}$.

Individual character decoding system 100 may be implemented on a digital microprocessor or on a general purpose processor. In the preferred embodiment, the widths of the feature values provided by estimator 104 and selector 106 are normalized to the width of the narrowest bar or space in the symbology being decoded. When the present invention is applied to decode the Code 39 symbology, $T_1$ and $T_2$ are preferably set at 2.0 and 1.5, respectively. Similarly, when the present invention is applied to decode the Code 128 symbology, $T_1$ and $T_2$ are preferably set at 1.0 and 0.75, respectively.

Bar Code Symbology Identification System

The system shown in FIGS. 1, 1A and described above may be employed to decode both data characters and control characters (such as stop/start characters) from bar code symbols within pixel image 102. Thus, in accordance with a further aspect of the present invention, the system of FIG. 1, 1A may also be used to identify the symbologies used to encode bar code symbols within pixel image 102. During the symbology identification mode, selector 106 selects a feature vector representing one of a plurality of prototype bar patterns each of which corresponds to a particular start/stop character. In this mode, selector 106 preferably selects from a set feature vectors corresponding to a plurality of start/stop characters representing more than one bar code symbology. Subtractor 107 then determines in accordance with equation (1) above the differences between corresponding elements from the feature vector provided by selector 106 and a feature vector provided by estimator 104 that is representative of the sensed pixel image 102. If the difference between any of the corresponding features evaluated by subtractor 107 is greater than the threshold $T_1$, then the current prototype bar pattern (corresponding to a given start/stop character) is rejected by comparator 108, a new prototype bar pattern (corresponding to a different start/stop character) is selected, and the process is repeated by subtractor 107 and comparator 108 using the feature vector associated with the newly selected prototype bar pattern. If the difference between any of the corresponding features evaluated by subtractor 107 does not exceed the threshold $T_1$, then the plurality of individual difference values determined by subtractor 107 are stored by storage means 110. Next, summer 112 determines the Euclidian distance between the two feature vectors provided by estimator 104 and selector 106 by determining a composite distance value ($D_{comp}$) in accordance with equation (2) above. Thereafter, for each prototype bar pattern chosen by selector 106, a composite distance $D_{comp}$ corresponding to that prototype bar pattern will be generated by summer 112 so long as the prototype bar pattern had not been rejected by comparator 108. Summer 112 preferably normalizes each $D_{comp}$ value by dividing each $D_{comp}$ value by the number of orders in the multi-order feature vectors provided to subtractor 107. Comparator 114 compares this normalized $D_{comp}$ value to a second threshold ($T_2$). If T2 has been exceeded, then the current prototype bar pattern is rejected; otherwise the $D_{comp}$ value determined for the current prototype bar pattern is stored in storing means 115. After all the prototype bar patterns (corresponding to all the potential start/stop characters) have been selected and processed as set forth above, selector 116 evaluates all the composite distance values stored in storing means 115 and selects the minimum composite distance value ($D_{min}$). If no composite distance values were stored in storing means 115, then the system determines that the sensed character does not represent a start/stop character; otherwise the sensed character is determined to be the start/stop character from the reference table associated with the prototype bar pattern corresponding to $D_{min}$.

Decoding Using Multiple Scan Line Information

Figure 5:
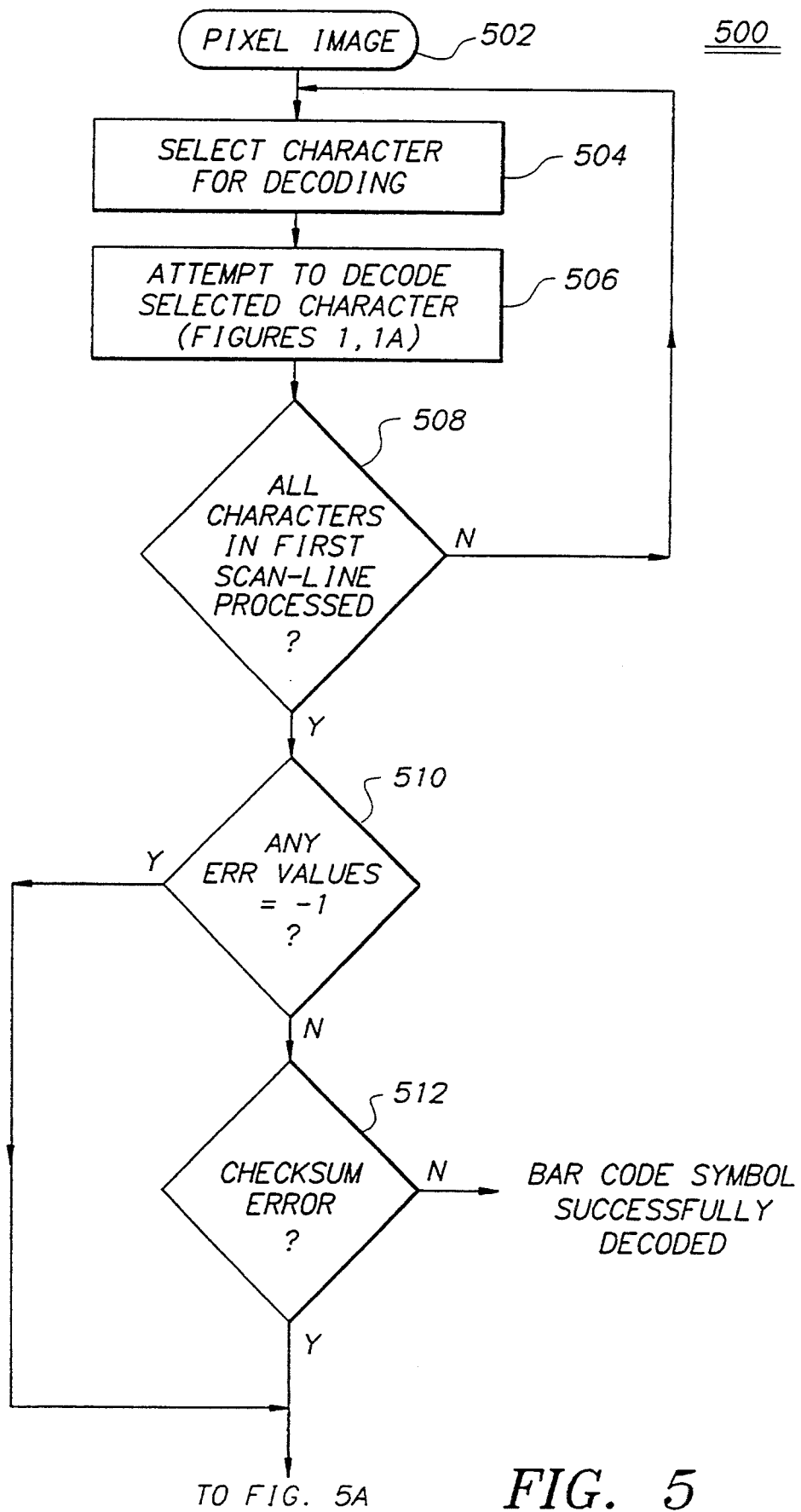
FIGS. 5, 5A, 5B show a flow diagram illustrating the operation of a system for decoding a bar code symbol using multiple scan lines in accordance with a preferred embodiment of the present invention.
Figure 5A:
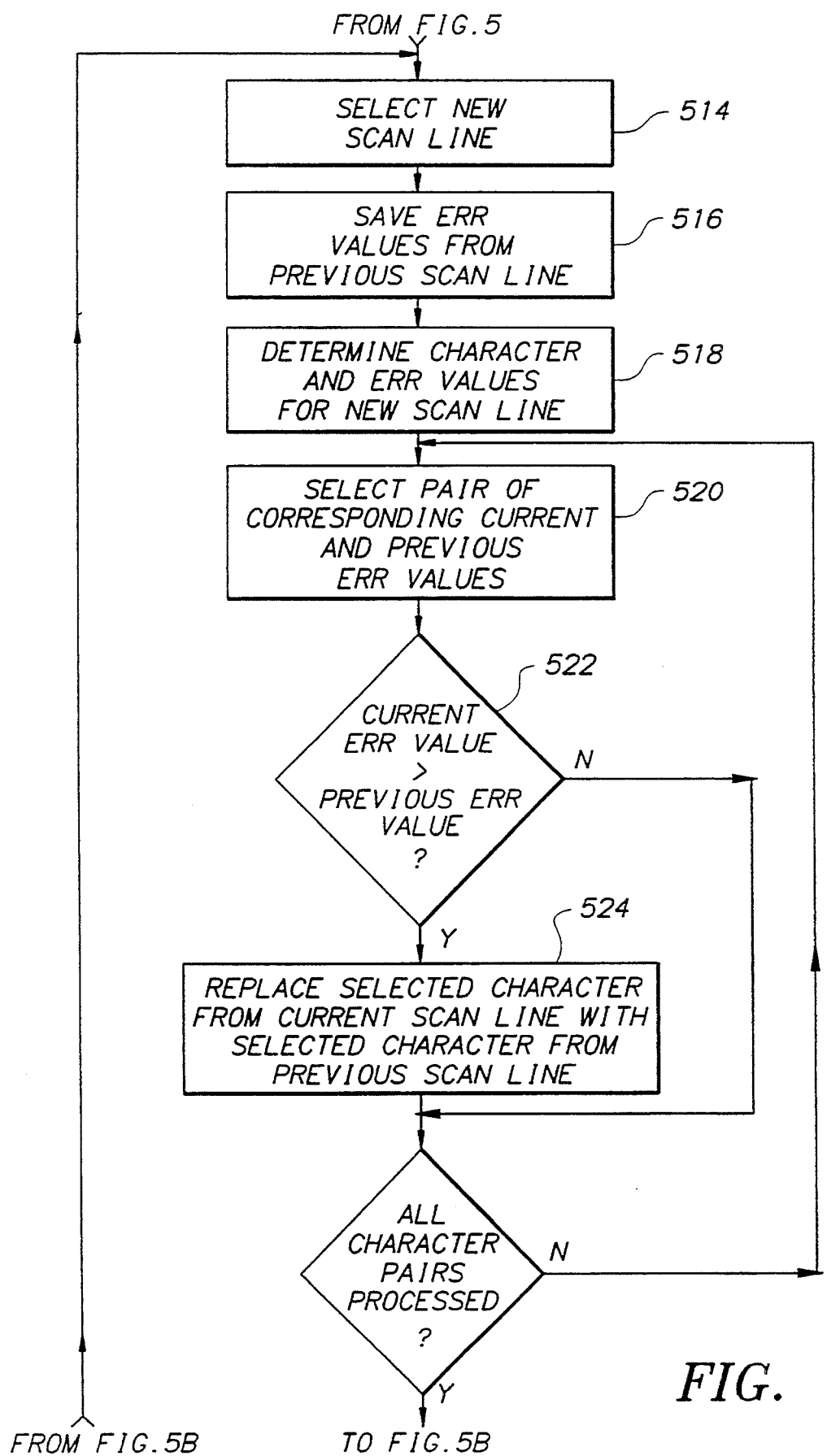
Figure 5B:
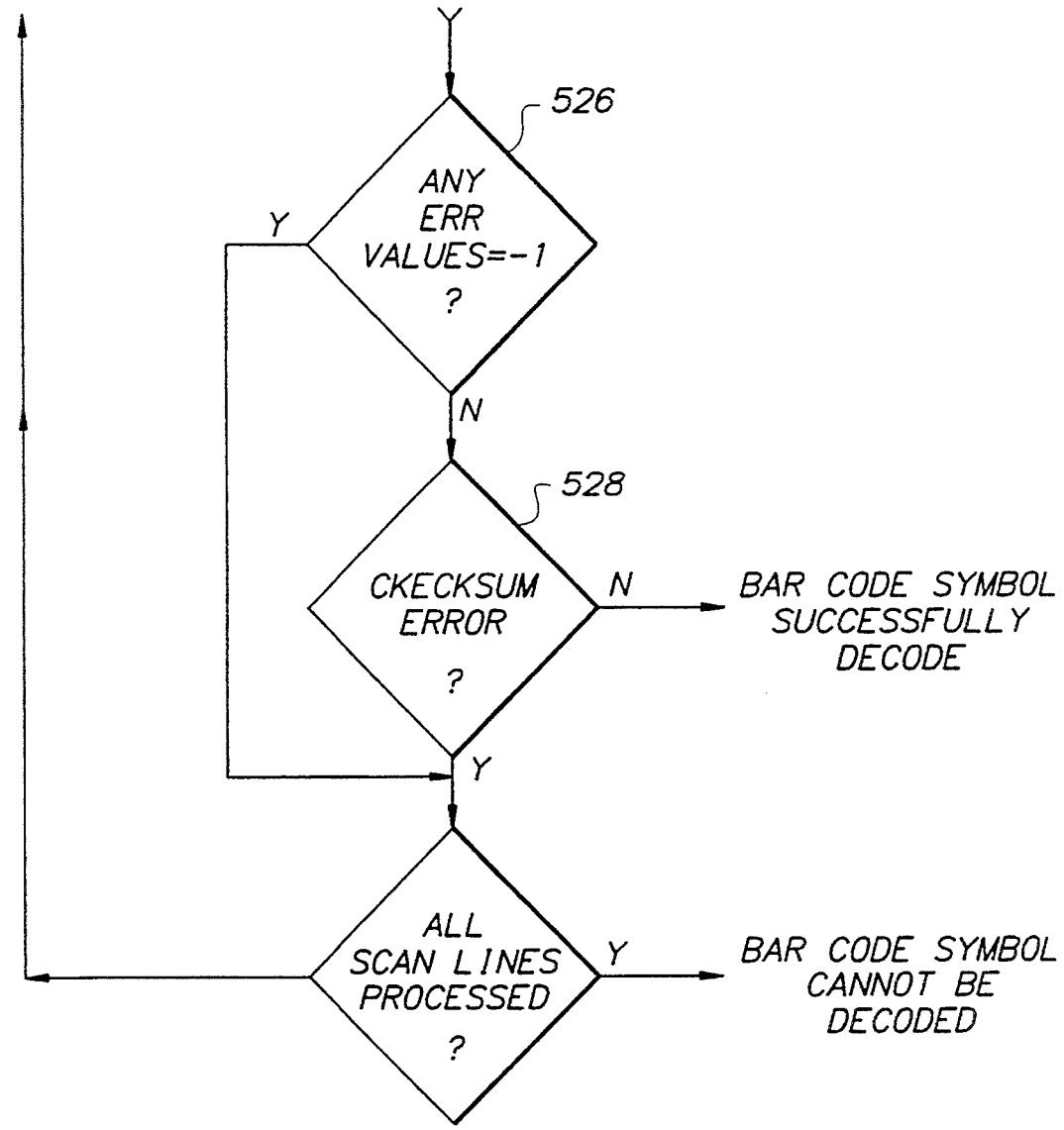

Referring now to FIGS. 5, 5A, 5B, there is shown a flow diagram illustrating the operation of a system 500 for decoding a bar code symbol using multiple scan lines passing through the bar code symbol in accordance with a preferred embodiment of the present invention. System 500 accepts as its input pixel image 502. Pixel image 502 may be a low resolution image representative of a bar code symbol that has been sensed by a CCD camera. Character selector 504 is provided for selecting an encoded character from pixel image 504 for decoding. Individual character decoder 506 is provided for attempting to decode the encoded character provided by selector 504. Decoder 506 functions substantially in accordance with system 100 described above. However, in addition to the functions performed by system 100, decoder 506 outputs a value ERR which is set to the value of $D_{min}$ when an individual character has been successfully decoded. In those situations where decoder 506 is unable to decode an individual character, ERR is set to the value −1. Scan line ending means 508 is provided for determining whether all the encoded characters in the current scan line have been processed by decoder 506. After all the encoded characters (including the checksum character) in the current scan line have been processed by decoder 506, comparator 510 compares each of the ERR values output by decoder 506 during decoding of the current scan line to −1. If none of the ERR values were set to −1, then comparator 512 evaluates the decoded character values to determine whether there is a checksum error. If there has been no checksum error and none of the ERR values were set to −1, then system 500 determines that the bar code symbol has been successfully decoded by the first scan line.

If comparator 510 determines that at least one of the ERR values output by decoder 506 was set to −1, or if comparator 512 determines that a checksum error is present, then new scan line selector 514 selects a new scan line passing through the bar code symbol (different from current scan line) for processing and memory means 516 saves the ERR values output by decoder 506 during decoding of the previous scan line. Next, decoding means 518 attempts to decode each individual encoded character in the newly selected scan line. Decoder 518 functions in substantially the same manner as decoder 506 described above. Thus, decoder 518 will output a value ERR which is set to the value of $D_{min}$ when an individual character has been successfully decoded and, in those situations where decoder 518 is unable to decode an individual character, the value of ERR will be set to −1.

Selector 520 is provided for selecting corresponding pairs of ERR values from the current and previous scan lines for comparison. For purposes of selector 520, the ERR values corresponding to the first character in the current scan line and the first character in the previous scan line represent a corresponding pair of ERR values; the ERR values corresponding to the second character in the current scan line and the second character in the previous scan line represent a corresponding pair of ERR values; and so on. Each pair of corresponding ERR values selected by selector 520 is provided to comparator 522. If the ERR value for the selected character in the current scan line is greater than the ERR value for the corresponding selected character in the previous scan line, then character substitution means 524 replaces the decoded character value and the ERR value for the selected character in the current scan line with the decoded character value and ERR value from the corresponding selected character in the previous scan line. The operation of substitution means 524 is described further below by means of an example in connection with FIG. 6.

After all the corresponding pairs of ERR values for the current and previous scan lines have been processed by selector 520 and comparator 522, comparator 526 compares each of the ERR values corresponding to the current scan line to −1. If none of the ERR values were set to −1, then comparator 528 evaluates the decoded character values in the current scan line to determine whether there is a checksum error. If there has been no checksum error and none of the ERR values are set to −1, then system 500 determines that the bar code symbol has been successfully decoded by the current scan line. If comparator 526 determines that at least one of the ERR values in the current scan line is set to −1, or if comparator 528 determines that a checksum error is present, then a further new scan line is selected and the process is repeated from selector 514. In the preferred embodiment, system 500 will select up to seven scan lines in order to attempt to decode a bar code symbol. If, after the processing of these seven scan lines, either an ERR value of −1 or a checksum error remains, then system 500 determines that the bar code symbol being evaluated cannot be successfully decoded. Decoding system 500 may be implemented on a digital microprocessor or on a general purpose processor.

In an alternate embodiment of the present invention (not shown), system 500 may be configured so that comparators 512 and 528 are removed from the system. In this alternate embodiment, system 500 will determine that a bar code symbol has been successfully decoded so long as none of the ERR values in the scan line were set to −1. This alternate embodiment, which does not consider the presence of checksum errors in determining whether a bar code symbol has been successfully decoded, may be employed to decode versions of the Code 39 symbology which do not employ a checksum character.

Referring now to FIG. 6, the operation of system 500 in general and character substitution means 524 in particular during multiple scan lines is illustrated in connection with the decoding of an exemplary bar code symbol 600. Bar code symbol 600 has been encoded in accordance with the code 39 symbology and includes the following six encoded data characters: "0", "1", "2", "3", "4", and "5". In the example shown, decoder 506 attempts to decode symbol 600 by traversing Scan Line 1 and sequentially attempting to decode each data character along that scan line. In connection with this first scan line, decoder 506 respectively decodes the first, second, fourth, fifth and six data characters in symbol 600 as "A", "1""M", "4"and "5". In addition, decoder 506 outputs an ERR value of 0.91 for the first data character, an ERR value of 0.52 for the second data character, an ERR value of 0.95 for the fourth data character, an ERR value of 0.01 for the fifth data character, and an ERR value of 0.10 for the sixth data character. In Scan Line 1, decoder 506 was unable to successfully decode the third data character in bar code symbol 600 and the ERR value for this data character was therefore assigned the value of −1.

In the example of FIG. 6, since all the characters in bar code symbol 600 were not successfully decoded by the first scan line, the character and ERR values from the first scan line are saved and system 500 proceeds to Scan Line 2. In the example shown, during the decoding of the first data character along Scan Line 2, decoder 518 outputs an ERR value greater than 0.91. Since during the decoding along the first scan line, the first data character was decoded in accordance with an ERR value of 0.91, the character and ERR values from the first scan line ("A" and 0.91) are substituted by substitution means 524 in place of the decoder output for the first data character that resulted from Scan Line 2. During the decoding of the second data character along Scan Line 2, decoder 518 assigns a "1" to the second data character and an associated ERR value of 0.40. Since during the decoding along the first scan line, the second data character was decoded as a "1" in accordance with an ERR value of 0.52, the character and ERR values from the second scan line ("1 " and 0.40) are retained in the second scan line by substitution means 524. During the decoding of the third data character along Scan Line 2, the third data character is decoded as "2" and decoder 518 outputs an associated ERR value for this data character of 0.59. Since during the decoding along the first scan line, the third data character was decoded in accordance with an ERR value of −1(i.e., the third data character could not be successfully decoded by the first scan line) the character and ERR values for the third data character from Scan Line 2 ("A" and 0.40) are retained in the second scan line by substitution means 524. During the decoding of the fourth, fifth and sixth data characters along Scan Line 2, decoder 518 respectively outputs ERR values greater than 0.95, 0.01 and 0.10. Since during the decoding along the first scan line, the fourth, fifth and sixth data characters were respectively decoded in accordance with ERR values of 0.95, 0.01 and 0.10, the character and associated ERR values for the fourth, fifth and sixth data characters from the first scan line are substituted by substitution means 524 in place of the decoder outputs for the fourth, fifth and sixth data characters that resulted from Scan Line 2.

In the example of FIG. 6, since two of the data characters in bar code symbol 600 were not correctly decoded by the first or second scan lines (i.e., the first and fourth data characters), the checksum for the bar code symbol (not shown) will result in a checksum error. Thus, the character and ERR values from the current scan line will be saved, and system 500 proceeds to Scan Line 3. During the decoding of the first data character along Scan Line 3, decoder 518 assigns a "0" to the first data character and an associated ERR value of 0.20. Since during decoding along a previous scan line, the second data character was decoded as a "A" in accordance with an ERR value of 0.91, the character and ERR values from the current scan line ("0"and 0.20) are retained in the current scan line by substitution means 524. During the decoding of the second, third, fourth, fifth and sixth data characters along Scan Line 3, decoder 518 respectively outputs ERR values greater than 0.40, 0.59, 0.95, 0.01 and 0.10. Since during decoding along a previous scan line, the second, third, fourth, fifth and sixth data characters were respectively decoded in accordance with ERR values of 0.40, 0.59, 0.95, 0.01 and 0.10, the character and ERR values for the second, third, fourth, fifth and sixth data characters from the previous scan line are substituted by substitution means 524 in place of the decoder outputs for the second, third, fourth, fifth and sixth data characters that resulted from Scan Line 3.

Referring still to the example of FIG. 6, since one of the data characters in bar code symbol 600 was not correctly decoded by the first, second or third scan lines (i.e., the fourth data character), the checksum for the bar code symbol (not shown) will result in a checksum error. Thus, the character and ERR values from the current scan line will be saved, and system 500 proceeds to Scan Line 4. During the decoding of the first and second data characters along Scan Line 4, decoder 518 respectively outputs ERR values greater than 0.20 and 0.40. Since during decoding along a previous scan line, the first and second data characters were respectively decoded in accordance with ERR values of 0.20 and 0.40, the character and ERR values for the first and second data characters from the previous scan line are substituted by substitution means 524 in place of the decoder outputs for the first and second data characters that resulted from Scan Line 4. During the decoding of the third data character along Scan Line 4, decoder 518 assigns a "2" to the third data character and an associated ERR value of 0.09. Since during decoding along a previous scan line, the third data character was decoded as a "2" in accordance with an ERR value of 0.59, the character and ERR values from the current scan line ("2" and 0.09) are retained in the second scan line by substitution means 524. During the decoding of the fourth, fifth and sixth data characters along Scan Line 4, decoder 518 respectively outputs ERR values greater than 0.95, 0.01 and 0.10. Since during decoding along a previous scan line, the fourth, fifth and sixth data characters were respectively decoded in accordance with ERR values of 0.95, 0.01 and 0.10, the character and ERR values for the fourth, fifth and six data characters from the previous scan line are substituted by substitution means 524 in place of the decoder outputs for the fourth, fifth and sixth data characters that resulted from Scan Line 4.

Referring still to the example of FIG. 6, since one of the data characters in bar code symbol 600 was not correctly decoded by the first, second, third or fourth scan lines (i.e., the fourth data character), the checksum for the bar code symbol will result in a checksum error. Thus, the character and ERR values from the current scan line will be saved, and system 500 proceeds to Scan Line 5. During the decoding of the first, second and third data characters along Scan Line 5, decoder 518 respectively outputs ERR values greater than 0.20, 0.40 and 0.09. Since during decoding along a previous scan line, the first, second and third data characters were respectively decoded in accordance with ERR values of 0.20, 0.40 and 0.09, the character and ERR values for the first, second and third data characters from the previous scan line are substituted by substitution means 524 in place of the decoder outputs for the first, second and third data characters that resulted from Scan Line 5. During the decoding of the fourth data character along the fifth scan line, decoder 518 assigns a "3" to the fourth data character and an associated ERR value of 0.15. Since during decoding along a previous scan line, the fourth data character was decoded as a "M" in accordance with an ERR value of 0.95, the character and ERR values from the current scan line ("3" and 0.15) are retained in the current scan line by substitution means 524. During the decoding of the fifth and sixth data characters along Scan Line 5, decoder 518 respectively outputs ERR values greater than 0.01 and 0.10. Since during decoding along a previous scan line, the fifth and sixth data characters were respectively decoded in accordance with ERR values of 0.01 and 0.10, the character and ERR values for the fifth and six data characters from a previous scan line are substituted by substitution means 524 in place of the decoder outputs for the fifth and sixth data characters that resulted from Scan Line 5.

In the example of FIG. 6, after the completion of Scan Line 5, system 500 will have successfully decoded all the data characters in bar code symbol 600, no checksum error will be present, and comparator 528 will indicate that bar code symbol 00 has been successfully decoded.

The present invention may be embodied in other specific forms without departing from the spirit or essential attributes of the invention. Accordingly, reference should be made to the appended claims, rather than the foregoing specification, as indicating the scope of the invention.

What is claimed is:

1. A method for decoding a pixel image representative of a bar code symbol comprising a plurality of encoded characters each of which corresponds to one of a plurality of prototype bar patterns, comprising the steps of: (A) scanning said bar code along a first scan line to determine a first set of candidate character values, each candidate character value of said first set having an error value associated therewith;

(B) if said scanning along said first scan line results in an unsuccessful reading of said bar code symbol, scanning said bar code symbol along a second differing scan line to determine a second set of candidate character values, each candidate character value of said second set having an error value associated therewith;

(C) comparing corresponding error values associated with said first and second sets of candidate character values;

(D) for each corresponding pair of candidate character values from said first and second sets, selecting said candidate character value having a minimum associated error value;

(E) forming a third set of candidate character values in accordance with said selected candidate character values; and (F) decoding said bar code symbol in accordance with said third set of candidate character values.

2. The method of claim 1, wherein said scanning along said first scan line will result in an unsuccessful reading of said bar code symbol if at least one of said plurality of encoded character values is not successfully decoded along said first scan line.

3. The method of claim 12 wherein said scanning along said first scan line will result in an unsuccessful reading of said bar code symbol if said scanning along said first scan line results in a checksum error.

4. The method of claim 1, wherein each of said prototype bar patterns has a set of predetermined bar width feature values associated therewith, and wherein step (A) comprises the steps of:
 i. determining a set of bar width information estimates representative of a selected encoded character in said bar code symbol;
 ii. selecting a prototype bar pattern for comparison;
 iii. comparing said set of bar width information estimates to a selected set of predetermined prototype bar width feature values to determine a plurality of individual difference values, wherein each of said individual difference values represents the difference between one of said bar width information estimates and a corresponding predetermined bar width feature value, and wherein said selected set of predetermined bar width feature values corresponds to said prototype bar pattern selected in step ii;
 iv. calculating a composite distance value corresponding to said prototype bar pattern selected in step ii. in accordance with each of said individual difference values;
 v. generating a plurality of composite distance values corresponding to a plurality of differing prototype bar patterns by repeating steps ii. –iv.;
 vi. selecting from said plurality of composite distance values the minimum composite distance value;
 vii. determining a candidate character value for said selected encoded character in accordance said prototype bar pattern associated with said selected minimum composite distance value;
 viii. determining said associated error value for said candidate character value to be said minimum composite distance value; and
 ix. repeated steps i. –viii. for each encoded character in said bar code symbol.

5. The method of claim 4, wherein said set of bar width information estimates is comprised of a multi-order feature vector.

6. The method of claim 4, wherein step iii. further comprises comparing on a one-to-one basis corresponding elements from said set of bar width information estimates and said selected set of predetermined prototype bar width feature values.

7. An apparatus for decoding a pixel image representative of a bar code symbol comprising a plurality of encoded characters each of which corresponds to one of a plurality of prototype bar patterns, comprising:
 (A) means for scanning said bar code along a first scan line to determine a first set of candidate character values, each candidate character value of said first set having an error value associated therewith;
 (B) means for scanning said bar code symbol along a second differing scan line to determine a second set of candidate character values if said scanning along said first scan line results in an unsuccessful reading of said bar code symbol, each candidate character value of said second set having an error value associated therewith;
 (C) a comparator for comparing corresponding error values associated with said first and second sets of candidate character values;
 (D) means for selecting, for each corresponding pair of candidate character values from said first and second sets, said candidate character value having a minimum associated error value;
 (E) means for forming a third set of candidate character values in accordance with said selected candidate character values; and
 (F) a decoder for decoding said bar code symbol in accordance with said third set of candidate character values.

8. The apparatus of claim 7, wherein each of said prototype bar patterns has a set of predetermined bar width feature values associated therewith, and wherein said means for scanning said bar code symbol along said first scan line comprises:
 i. means for determining a set of bar width information estimates representative of a selected encoded character in said bar code symbol;
 ii. a first selector for selecting a prototype bar pattern for comparison;
 iii. means for comparing said set of bar width information estimates to a selected set of predetermined prototype bar width feature values to determine a plurality of individual difference values, wherein each of said individual difference values represents the difference between one of said bar width information estimates and a corresponding predetermined bar width feature value, and wherein said selected set of predetermined bar width feature values corresponds to said prototype bar pattern selected by said first selector;
 iv. means for calculating a composite distance value corresponding to said prototype bar pattern selected by said first selector in accordance with each of said individual difference values;
 v. means for generating a plurality of composite distance values corresponding to a plurality differing prototype bar patterns;
 vi. a second selector for selecting from said plurality of composite distance values the minimum composite distance value;
 vii. means for determining a candidate character value for said selected encoded character in accordance said prototype bar pattern associated with said selected minimum composite distance value; and
 viii. means for determining said associated error value for said candidate character value to be said minimum composite distance value.

9. The apparatus of claim 8, wherein said set of bar width information estimates is comprised of a multi-order feature vector.

10. The apparatus of claim 8, wherein said means for comparing further comprises means for comparing on a one-to-one basis corresponding elements from said set of bar width information estimates and said selected set of predetermined prototype bar width feature values.

* * * * *

UNITED STATES PATENT AND TRADEMARK OFFICE
CERTIFICATE OF CORRECTION

PATENT NO. : 5,438,188
DATED : August 1, 1995
INVENTOR(S) : Stefan Surka

It is certified that error appears in the above-indentified patent and that said Letters Patent is hereby corrected as shown below:

Column 6, line 14, delete "$p_i^k$" and insert therefore --$p_i^k|$, k--.

Signed and Sealed this

Fourteenth Day of May, 1996

Attest:

BRUCE LEHMAN

*Attesting Officer*    *Commissioner of Patents and Trademarks*